United States Patent
Monin et al.

(10) Patent No.: US 7,291,843 B2
(45) Date of Patent: Nov. 6, 2007

(54) SOLID-STATE X-RAY DETECTOR

(75) Inventors: Didier Monin, St Etienne de Crossey (FR); Bruno Commere, Saint-Egreve (FR); Gérard Vieux, Froges (FR)

(73) Assignee: Thales, Neuilly-sur Seine (FR)

( * ) Notice: Subject to any disclaimer, the term of this patent is extended or adjusted under 35 U.S.C. 154(b) by 39 days.

(21) Appl. No.: 10/539,620

(22) PCT Filed: Dec. 16, 2003

(86) PCT No.: PCT/EP03/51016

§ 371 (c)(1),
(2), (4) Date: Feb. 13, 2006

(87) PCT Pub. No.: WO2004/055549

PCT Pub. Date: Jul. 1, 2004

(65) Prior Publication Data

US 2006/0153334 A1    Jul. 13, 2006

(30) Foreign Application Priority Data

Dec. 17, 2002  (FR) .................................. 02/15995

(51) Int. Cl.
*G01T 1/20*    (2006.01)
(52) U.S. Cl. .............................. 250/370.11; 250/361 R; 378/98.8

(58) Field of Classification Search ........... 250/370.11, 250/361 R; 378/98.8
See application file for complete search history.

(56) References Cited

U.S. PATENT DOCUMENTS

| 5,932,880 A | 8/1999 | Kakibayashi et al. |
| 6,455,855 B1 * | 9/2002 | Kwasnick et al. ...... 250/361 R |

FOREIGN PATENT DOCUMENTS

| FR | 2605166 A | 4/1988 |
| FR | 2758654 A | 7/1998 |
| FR | 2758656 A | 7/1998 |
| FR | 2760585 A | 9/1998 |
| FR | 2831671 A | 5/2003 |

* cited by examiner

*Primary Examiner*—David Porta
*Assistant Examiner*—Mark R Gaworecki
(74) *Attorney, Agent, or Firm*—Lowe Hauptman & Berner, LLP

(57) ABSTRACT

A solid-state X-ray detector comprising a photosensitive sensor combined with a radiation converter or scintillator is described. The radiation detector includes an entry window through which the X-rays upstream of the scintillator pass, and means for applying an electrical voltage between the entry window and the photosensitive sensor.

18 Claims, 5 Drawing Sheets

SOLID-STATE X-RAY DETECTOR

CROSS REFERENCE TO RELATED APPLICATIONS

The present Application is based on International Application No. PCT/EP2003/051016, filed on Dec. 16, 2003, which in turn corresponds to FR 02/15995 filed on Dec. 17, 2002, and priority is hereby claimed under 35 USC §119 based on these applications. Each of these applications are hereby incorporated by reference in their entirety into the present application.

FIELD OF THE INVENTION

The present invention relates to a solid-state X-ray detector comprising a photosensitive sensor combined with a radiation converter. The fields of application of this type of detector are especially radiology, namely radiography, fluoroscopy and mammography, but also nondestructive testing.

BACKGROUND OF THE INVENTION

Such radiation detectors are known for example from French patent FR 2 605 166 in which a photosensitive sensor formed from amorphous silicon photodiodes is combined with a radiation converter.

The operation and the structure of such a radiation detection will be briefly recalled.

The photosensitive sensor is generally made from solid-state photosensitive elements arranged in a matrix. The photosensitive elements are made from semiconductor materials, usually single-crystal silicon for sensors of the CCD or CMOS type, polycrystalline silicon or amorphous silicon. A photosensitive element comprises at least one photodiode, phototransistor or photoresistor. These elements are deposited on a substrate, generally a glass plate.

In general, these elements are not directly sensitive to very short wavelength radiation, such as X-rays or gamma rays. This is why the photosensitive sensor is combined with a radiation converter, which includes a layer of a scintillating substance. This substance has the property, when it is excited by such radiation, of emitting radiation of longer wavelength, for example visible light or light near the visible, to which the sensor is sensitive. The light emitted by the radiation converter illuminates the photosensitive elements of the sensor, which perform a photoelectric conversion and deliver electrical signals that can be exploited by suitable circuits. In the rest of the description the radiation converter will be called a scintillator.

Certain scintillating substances of the family of alkali metal halides or rare-earth oxysulfides are frequently employed for their good performance characteristics.

Among alkali metal halides, cesium iodide, doped with sodium or thallium depending on whether emission at around 400 nanometers or at around 550 nanometers is desired respectively, is known for its strong X-ray absorption and for its excellent fluorescence yield. It is in the form of fine needles that are grown on a support. These needles are approximately perpendicular to this support and partly confine the light emitted toward the sensor. Their fineness determines the resolution of the detector. Lanthanum and gadolinium oxysulfides are also very widely employed for the same reasons.

However, among these scintillating substances, some have the drawback of being not very stable—they partly decompose when exposed to moisture and their decomposition releases chemical species that migrate either toward the sensor or away from the sensor. These species are highly corrosive. Cesium iodide and lanthanum oxysulfide in particular have this drawback.

As regards cesium iodide, its decomposition gives cesium hydroxide $Cs^+OH^-$ and free iodine $I_2$, which can then combine with iodide ions to give the complex $I_3^-$.

As regards lanthanum oxysulfide, its decomposition gives hydrogen sulfide $H_2S$, which is chemically very corrosive.

The degradation of the scintillating substance may especially be responsible for the appearance of leakage currents in the photodetection matrix structure, which leakage currents may cause visible and in addition evolving impairment of the image produced by the detector.

Moisture is extremely difficult to eliminate. The ambient air, and the cement used for assembling the detector, always contain moisture. The presence of moisture in the cement is due either to the ambient air or to the polymerization reaction, if this results from the condensation of two chemical species, which is frequently the case.

One of the important aspects when producing these detectors is to minimize the amount of moisture, initially present inside the detector and in contact with the scintillator, and to prevent this moisture from diffusing into the sensor during its operation.

The radiation detectors have an entry window through which the X-rays upstream of the scintillator pass. Moreover, the schintillating substance is generally deposited on a metal substrate. The substrate and the schintillating substance then form the scintillator. In addition, it is known to use the substrate as entry window.

When the schintillating substance is deposited directly on the entry window in order to form the scintillator, which is then attached to the sensor, the entry window must withstand, without being damaged, the thermal stresses arising from the deposition and treatment of the scintillator and must preferably have an expansion coefficient of the same order of magnitude as that of the scintillator and that of the sensor, more particularly that of its substrate. Provision may also be made for the window to have a low elastic modulus, thereby making it possible to eliminate differential strains between, on the one hand, the window and the scintillator and, on the other hand, the window and the sensor, or more particularly the sensor substrate. This thus eliminates the risks of the scintillator cracking and the sensor substrate fracturing.

It has also been sought to separate the entry window and scintillator substrate functions by adding an additional entry window that provides only the function of sealing the detector. The stresses to which the scintillator substrate was subjected are then distributed between the substrate and the additional entry window. The scintillator substrate remains subject to the same reflectivity and surface-finish constraints for scintillator deposition as in the prior art. However, it is no longer subject to the sealing and support constraints of the seal. These constraints are transferred to the additional entry window. Such a construction is disclosed in patent application FR 01/13899 filed on Oct. 26, 2001 in the name of the Applicant.

These precautions for improving the sealing of the detector are not sufficient to completely stop the scintillating substances from decomposing. It has been realized that the migration of ionic species is promoted by the existence of an electric field induced between the matrix of photosensitive elements and the scintillator substrate during operation of the detector.

SUMMARY OF THE INVENTION

The object of the invention is to limit the decomposition of the scintillating substances. For this purpose, the subject of the invention is a solid-state X-ray detector comprising a photosensitive sensor, a scintillator, which converts the X-rays into radiation to which the sensor is sensitive, the detector including means for eliminating the electric field induced between the matrix of photosensitive elements and the scintillator substrate during operation of the detector.

In other words, the subject of the invention is a solid-state X-ray detector comprising a photosensitive sensor, a scintillator, which converts the X-rays into radiation to which the sensor is sensitive, and an entry window through which the X-rays upstream of the scintillator pass, characterized in that the detector includes means for applying an electrical voltage between the entry window and the photosensitive sensor.

The invention may be embodied in two configurations of the way in which the scintillator and the sensor are assembled.

In a first configuration, called the attached scintillator configuration, the scintillating substance is deposited on a substrate that the radiation to be detected must pass through before it reaches the sensor. The substrate forms the entry window of the detector. The assembly is then adhesively bonded to the sensor.

In a second configuration, called the direct deposition configuration, the sensor serves as substrate for the scintillating substance, which is therefore in direct and intimate contact with the sensor. The scintillating substance is then covered with a protective foil forming the entry window of the detector. The two configurations each have advantages and disadvantages.

The first configuration allows the scintillator and the sensor to be optimized separately. The scintillator can then receive heat treatments, even if these are incompatible with the sensor. To deposit cesium iodide, this is evaporated by heating it and is deposited on the substrate by condensing thereon. Next, an annealing operation at about 300° C. is carried out in order to achieve the optimum fluorescence yield. When the schintillating substance is deposited directly on the sensor in the second configuration, called the direct deposition configuration, a compromise must be made as regards the annealing temperature so as not to damage the sensor.

Another advantage of the first configuration is that the sensor and the scintillator are assembled only if they have been successfully tested, thereby allowing the overall manufacturing yield to be improved. The first configuration allows better production flux control, by manufacturing the two elements, namely the scintillator with its substrate on the one hand and the sensor on the other, separately. In the second configuration, called the direct deposition configuration, each time the scintillator is defective the sensor is scrapped, as it is not risked to recycle it. The cost of the substrate as described in the first configuration is lower than that of the sensor serving as substrate for the schintillating substance in the second configuration. Thus, a smaller loss will be borne in the event of a deficient scintillating substance being deposited, which would result in the scintillator and its substrate being eliminated.

In the first configuration, the thickness of cement for the assembly operation introduces a few losses in terms of spatial resolution of the X-ray detector and of light collection. In contrast, direct deposition of the scintillator on the sensor offers the best optical coupling conditions.

Finally, the first configuration may apply to photosensitive elements consisting of arrays of several elements butted together, such as those described for example in the French patents published under the numbers FR 2 758 654 and FR 2 758 656. The second configuration cannot be applied to such photosensitive arrays consisting of arrays of several elements butted together, owing to the poor dimensional stability of such arrays at a temperature of 300° C., which temperature is necessary for the operation of the scintillating substance after it has been deposited on its substrate.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The invention will be more clearly understood and other features and advantages will become apparent on reading the detailed description of several embodiments of the invention, embodiments that are given by way of example. The description is illustrated by the appended drawing in which.

DETAILED DESCRIPTION OF THE INVENTION

These figures have not been drawn to scale for the sake of clarity.

Figure 1:
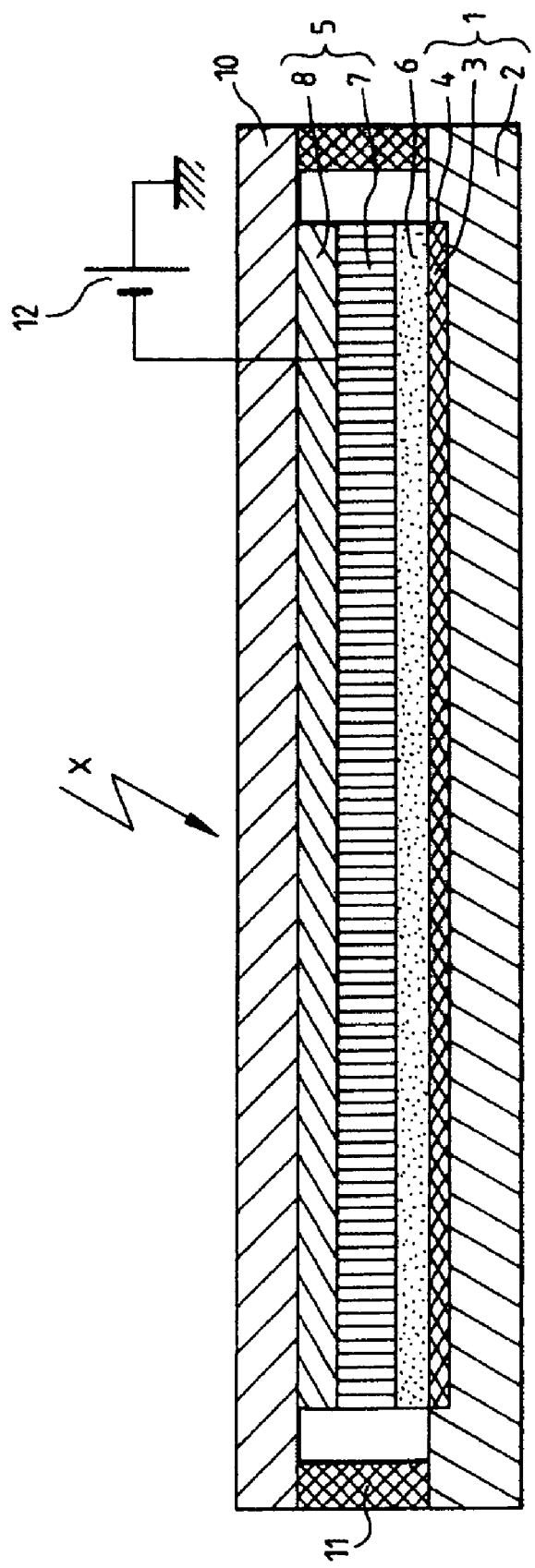
FIG. 1 shows a radiological detector according to the first configuration.

The first configuration, called the attached scintillator configuration, is shown in FIG. 1. The radiation sensor bears the reference 1. It comprises a substrate 2, in principle a glass plate, which supports photosensitive elements 3. Each photosensitive element 3 is mounted between a row conductor and a column conductor so as to be able to be addressed. The conductors are not visible in the figure for the sake of simplification. The photosensitive elements 3 and the conductors are generally covered with a passivation layer 4 intended to protect them from moisture.

In this configuration, the sensor 1 cooperates with a scintillator 5 which, in the example, is optically coupled to the sensor 1 via optical cement 6. The scintillator 5 includes a layer of scintillating substance 7, shown with a structure in the form of needles, which is deposited on a substrate 8. The substrate 8 thus carries the schintillating substance 7. The schintillating substance 7 belongs, for example, to the family of alkali metal halides, such as cesium iodide which is particularly sensitive to wet oxidation, but it could also belong to the family of rare-earth oxysulfides, certain members of which are also not very stable, such as lanthanum oxysulfide. The substrate 8 forms the entry window of the detector.

Figure 2:
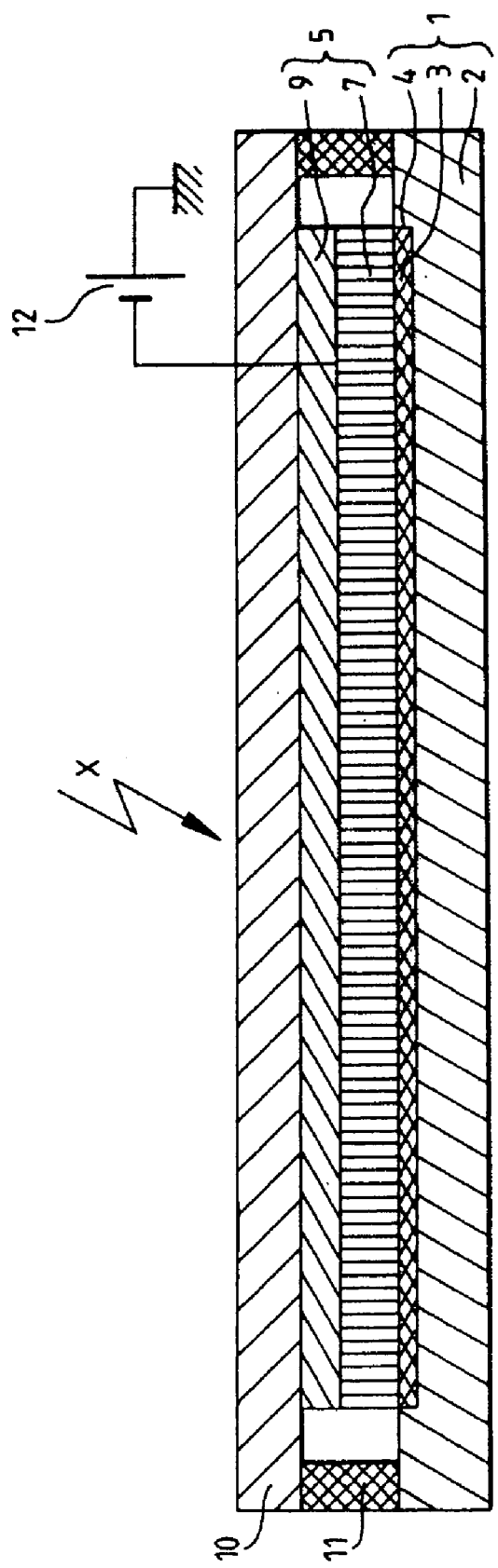
FIG. 2 shows a radiological detector according to the second configuration.

In the second configuration, shown in FIG. 2, called the direct deposition configuration, instead of the schintillating substance 7 being deposited on the substrate 8 and this assembly, forming the scintillator 5 on the sensor 1, being attached, as illustrated in FIG. 1, the scintillating substance 7 is deposited directly on the sensor 1 and a foil 9 covers the schintillating substance 7. The foil 9 serves to protect the schintillating substance 7 and it forms the entry window of the detector. For the sake of simplicity, in the second configuration, the assembly formed by the scintillating substance 7 and the foil 9 will bear the reference 5 and will be called, as in the first configuration, the scintillator.

In the X-ray detectors shown in FIGS. 1 and 2, an additional entry window 10 is placed on the scintillator 5 without being fastened to it. An impermeable seal 11 fixes the entry window 10 to the sensor 1, or more precisely to its substrate 2.

According to the invention, an electrical voltage 12 is applied between the entry window, 8 or 9 depending on the configuration adopted, and the photosensitive sensor 1.

During operation of the detector, positive electrical charges build up, for example, on the photosensitive elements 3 and tend to create an electric field directed from the entry window 8 or 9 toward the photosensitive sensor 1. By applying the electrical voltage 12, this electric field tends ideally to be eliminated. Optionally, the electrical voltage 12 may be modulated so as to create a nonzero electric field directed from the photosensitive sensor 1 to the entry window 8 or 9. This is because the photosensitive sensor generally comprises p-n junctions belonging to photodiodes or to phototransistors sensitive to photons emitted by the scintillator 5. The build-up of positive charges at the p-n junctions tends to modify the depletion zones of the p-n junctions and, consequently, to increase the leakage currents of the sensor 1 and therefore to reduce its sensitivity.

By applying the electrical voltage 12 to the entry window 8 or 9 it is possible to reduce the migration of ionic species, resulting from the decomposition of the scintillator 5, toward the sensor 1.

Applying the electrical voltage 12 has another advantage. This is because the detector and especially the sensor 1 operate at high impedance and are therefore easily able to be disturbed by internal or external electromagnetic interference. The entry window 8 or 9, when a voltage is applied to it, forms a shield against electromagnetic interference and therefore protects the detector.

The implementation of the invention is very simple. This is because the detector is controlled by an electronic circuit (not shown) that generally includes at least one DC voltage generator needed for its operation. The implementation of the invention may simply consist in connecting the DC voltage generator to the entry window 8 or 9. Since the electrical power consumed by implementing the invention is almost zero, it is not necessary to modify the voltage generator. This advantage allows the invention to be simply implemented on a detector that has not been designed for this purpose. In other words, it is easy to retrofit existing detectors in order to implement the invention.

The electrical voltage applied to the entry window 8 or 9 may be a DC voltage or may be modulated over time so as to follow as closely as possible the value of the potential applied to the sensor 1, which potential varies according to the operating phase of the sensor 1 which it is in. Two phases of the sensor 1 may mainly be detected, namely an acquisition phase and a read phase. For further details about the operation of a sensor 1, the reader may for example refer to the French patent application published under No. 2 760 585.

Advantageously, the detector includes means so that the voltage is applied substantially uniformly to the entry window 8, 9.

More precisely, the voltage is applied to the entry window 8 or 9 via one or more connections depending on the conductivity of the material used to make the entry window 8 or 9. For example, in the first configuration, if the substrate 8 is an aluminum plate, a fewer number of connections will be necessary than if the support 8 is made by means of a polymer substrate covered with a metallic layer, which may be produced by chemical deposition or by spraying.

FIGS. 3, 4 and 5 show examples of how the entry window 8 or 9 is electrically connected in the case in which this entry window is covered with an additional window 10. These three figures represent only a single electrical connection. Of course, it is possible to make several similar connections for the same entry window 8 or 9 so as to improve the uniformity of the potential applied to the entry window 8 or 9 by the electrical voltage.

Figure 3A:
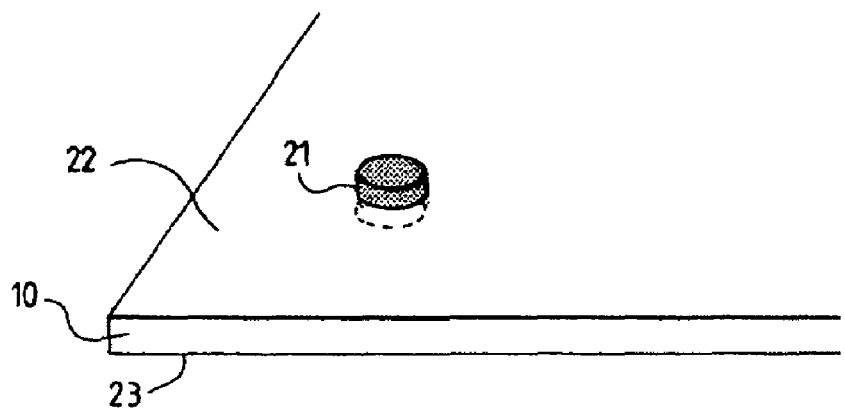
FIGS. 3a and 3b show an example of the connection of the entry window through the additional window.
Figure 3B:
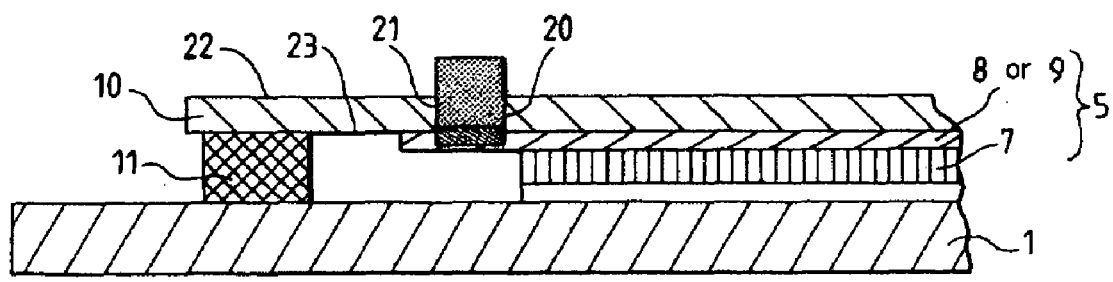

In FIGS. 3*a* and 3*b*, the means for applying the electrical voltage comprise an electrical junction 20 passing through the additional window 10. FIG. 3*a* shows in perspective the electrical junction 20 and FIG. 3*b* shows this same junction 20 in cross section.

More precisely, the electrical junction 20 comprises a conducting material connected to the entry window 8 or 9, for example by means of a conducting cement. The material fills a hole 21 made in the additional window 10 and emerges on the outside of the detector on a face 22 of the additional window 10, on the opposite side to that 23 in contact with the entry window 8 or 9. The material is advantageously chosen in such a way that its thermal expansion coefficient is close to that of the additional window 10. For example, if the additional window is made of glass, the material adopted may be an alloy of iron, nickel and cobalt such as for example dilver or kovar. The passage of the electrical junction 20 through the additional window 10 is sealed. The sealing is provided for example by means of a cement.

Figure 4A:
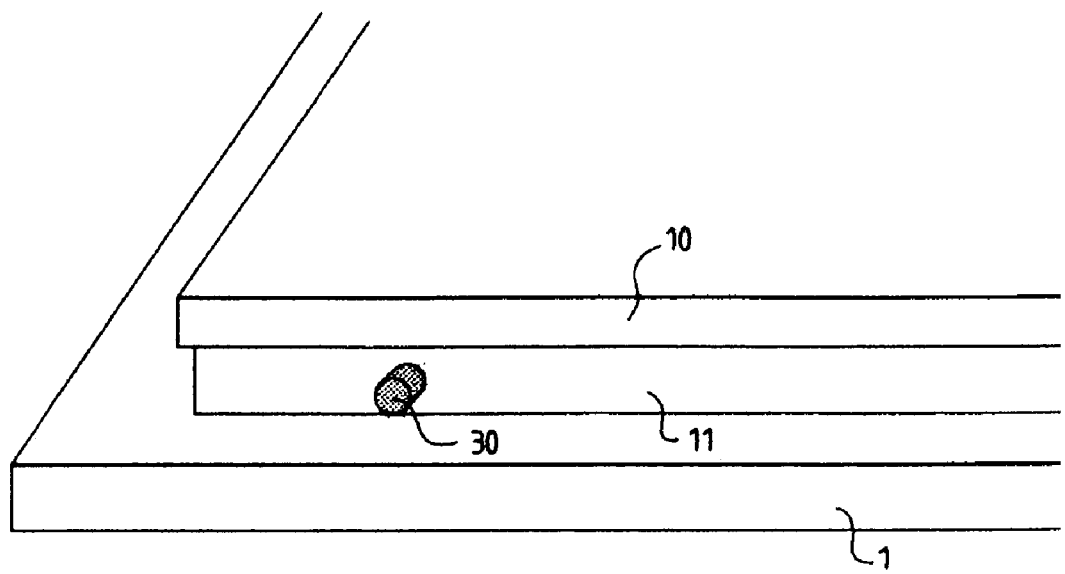
FIGS. 4a and 4b show an example of the connection of the entry window through a seal.
Figure 4B:
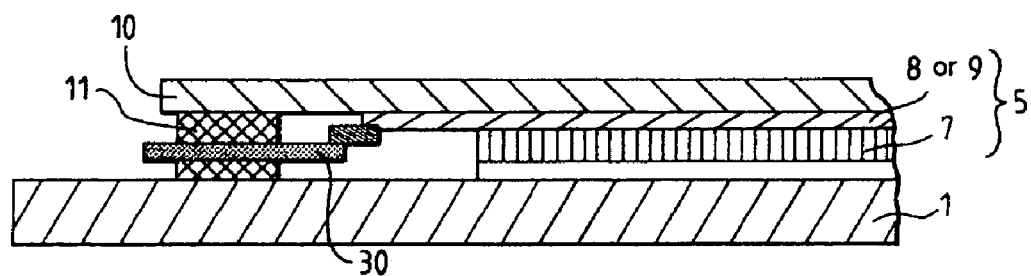

In FIGS. 4*a* and 4*b*, the means for applying the electrical voltage include a conducting passage 30 passing through the seal 11.

FIG. 4*a* shows in perspective the conducting passage 30 and FIG. 4*b* shows this same passage 30 in cross section. More precisely, the conducting passage 30 is made in a conducting material and its connection to the seal 11 is sealed. The conducting passage is connected on the inside of the detector to the entry window 8 or 9, for example by cementing. The electrical voltage is applied to the conducting passage 30 via the outside of the detector.

Figure 5A:
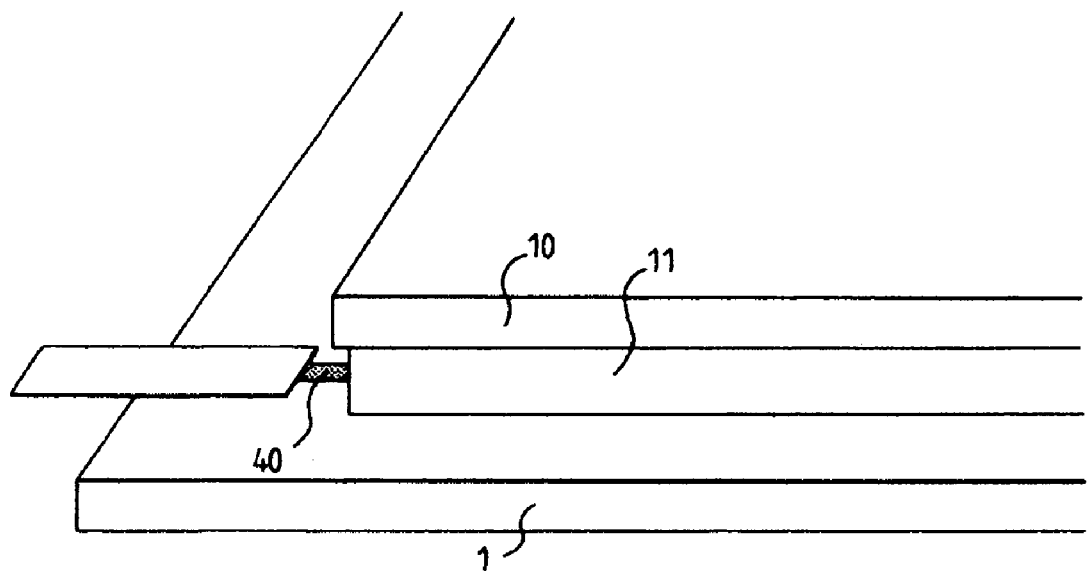
FIGS. 5a and 5b show an example of the connection of the entry window via a substrate of the photosensitive sensor.
Figure 5B:
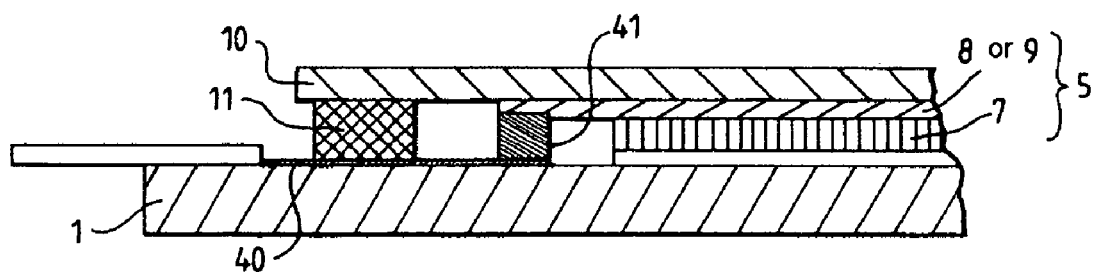

In FIGS. 5*a* and 5*b*, the means for applying the electrical voltage comprise a track 40 produced on the photosensitive sensor 1. FIG. 5*a* shows the track 40 in perspective and FIG. 5*b* shows the same track 40 in cross section. More precisely, the track 40 is for example made directly on the sensor 1, or more exactly on its substrate. The track 40 is connected on the inside of the detector to the entry window 8 or 9 by means of a conducting pad 41, which may be cemented both to the track 40 and to the entry window 8 or 9. As previously, the electrical voltage is applied to the track 40 via the outside of the detector. The sealing around the track 40 is provided by the seal 11.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A solid-state X-ray detector comprising:
a photosensitive sensor,
a scintillator, which converts the X-rays into radiation to which the sensor is sensitive, and
an entry window through which the X-rays upstream of the scintillator pass,
wherein the detector includes means for applying an electrical voltage between the entry window and the photosensitive sensor.

2. The X-ray detector as claimed in claim 1, wherein the scintillator comprises:
a substrate and
a scintillating substance,
wherein the substrate is separate from the sensor, and the substrate forms the entry window of the sensor.

3. The X-ray detector as claimed in claim 2, wherein the detector includes means for the voltage to be applied substantially uniformly to the entry window.

4. The X-ray detector as claimed in claim 2, wherein the electrical voltage is modulated over time.

5. The X-ray detector as claimed in claim 2, wherein an additional window is placed on the scintillator, without being fixed to the scintillator, and in that a moisture-impermeable seal fixes the additional window and the sensor.

6. The X-ray detector as claimed in claim 1, wherein the scintillator includes a scintillating substance, wherein the sensor is used as substrate for the scintillating substance wherein a foil for protecting the scintillator covers the scintillating substance and wherein the foil forms the entry window of the sensor.

7. The X-ray detector as claimed in claim 6, wherein the detector includes means for the voltage to be applied substantially uniformly to the entry window.

8. The X-ray detector as claimed in claim 6, wherein the electrical voltage is modulated over time.

9. The X-ray detector as claimed in claim 6, wherein an additional window is placed on the scintillator, without being fixed to the scintillator, and in that a moisture-impermeable seal fixes the additional window and the sensor.

10. The X-ray detector as claimed in claim 1, wherein the detector includes means for the voltage to be applied substantially uniformly to the entry window.

11. The X-ray detector as claimed in claim 10, wherein the electrical voltage is modulated over time.

12. The X-ray detector as claimed in claim 10, wherein an additional window is placed on the scintillator, without being fixed to the scintillator, and in that a moisture-impermeable seal fixes the additional window and the sensor.

13. The X-ray detector as claimed in claim 1, wherein the electrical voltage is modulated over time.

14. The X-ray detector as claimed in claim 13, wherein an additional window is placed on the scintillator, without being fixed to the scintillator, and in that a moisture-impermeable seal fixes the additional window and the sensor.

15. The X-ray detector as claimed in claim 1, wherein an additional window is placed on the scintillator, without being fixed to the scintillator, and in that a moisture-impermeable seal fixes the additional window and the sensor.

16. The X-ray detector as claimed in claim 15, wherein the means for the voltage to be applied substantially uniformly comprise an electrical junction passing through the additional window.

17. The X-ray detector as claimed in claim 15, wherein the means for the voltage to be applied substantially uniformly comprise a conducting passage passing through the seal.

18. The X-ray detector as claimed in claim 15, wherein the means for the voltage to be applied substantially uniformly comprise a track made on the photosensitive sensor.

* * * * *